Feb. 19, 1963 W. W. COX 3,077,694
DISPOSABLE SINKER DEVICE
Filed Aug. 17, 1961

INVENTOR
Walter W. Cox
BY
Adolph C. Hugin
ATTORNEY 3,077,694
DISPOSABLE SINKER DEVICE
Walter W. Cox, 3703 SW. 59th Ave., Miami, Fla.
Filed Aug. 17, 1961, Ser. No. 132,102
7 Claims. (Cl. 43—43.12)

This invention relates to casting apparatus for use on fishing tackle and is particularly directed to a disposable sinker device which will assist in casting bait as far as possible and be automatically released on contact with the water whereby the bait is left free to float or swim at or near the surface of the water.

For many kinds of fishing it is desirable to cast the bait a substantial distance from where the fisherman is standing when making the cast, and it also often is desirable that the bait should remain near the surface of the water. This is particularly true when fishing with live bait and with certain types of lures particularly useful in flycasting. As a rule, such bait is not sufficiently heavy to enable the fisherman to make a very long cast without the addition of a casting weight or sinker. In the past, the addition of a suitable casting weight or sinker to the end of a fishing line which was of sufficient size to improve the length of a cast usually also was of such a weight that it would pull the bait far down into the water and thereby reduce the luring effect of the bait on fish.

Numerous proposals have been made for providing releasable weight or sinker attachments to a fishing line to be released when the weight or sinker struck the water during a cast. Generally, these sinker attachments have been ineffective for the intended purposes, for the sinker usually was secured to the attachment element by a flexible line usually in the form of a loop extending over a hook. These former proposals have appeared to be practical theoretically, but actually have very rarely functioned properly to provide the desired release of the sinker at the end of a cast when the sinker strikes the water. The reason for the impracticality of these proposals has generally been because a sinker when in flight during a cast tends to move with a twisting and spinning motion which tightens and twists the sinker attachment line to the hook or other attaching element which is fastened to the end of the fishing line so that when the sinker strikes the water it is very securely fastened to the end of the fishing line and is not released therefrom. Often the sinker will pull the end of the fishing line and the bait down into the water, and, at times, the loop attaching the sinker will become sufficiently loose so that the sinker will be detached from the end of the line, but this usually does not occur until the bait has been drawn so far down into the water as to be relatively ineffective as a lure for fish.

According to the present invention a disposable sinker is provided which will supply the needed weight on the end of a fishing line to enable a fisherman to cast as far as appears desirable and yet will be immediately released when the end of the line strikes the water at the end of a cast. The present construction avoids the possibility of tightening of the connection between the sinker and the fishing line during a cast by making both parts of the releasable attachment device of rigid material. In addition, the part of the attachment device which remains secured to the end of the fishing line is formed of relatively lightweight material, and preferably is substantially transparent, so that it will have no effect in drawing the bait down into the water and will be substantially invisible to fish, so that it will not distract the fish's attention from the bait on the line.

In the simplest construction envisioned for the present invention, the attachment element secured to the end of the fishing line preferably is a ring or loop of rigid substantially transparent light weight plastic material, and the releasable attachment element to which the sinker is secured preferably is in the form of a U-shaped element of rigid material, preferably of metal, having a sufficient weight to provide for loosely hooking it through the ring element. One of the legs of the U-shaped element preferably is longer than the other leg, and it is of sufficient weight so that when it is passed through the ring element it will balance the other leg and a sinker attached thereto. This longer leg also preferably is formed with a relatively large water-engaging face, so that when a fishing line to which it is attached strikes water at the end of a cast the impact of the water on the water-engaging face will deflect it upwardly and the weight of the sinker on the other arm of the U-shaped element will draw this element from its hooked engagement with the attachment ring secured to the fishing line.

An object of this invention is to provide an improved disposable sinker device.

Another object of this invention is to provide an improved casting device utilizing a disposable sinker or casting weight which is relatively inexpensive to manufacture and which assures its release from the fishing line at the end of a cast when the line strikes the water.

A further object of this invention is to provide a simple disposable sinker device which will be readily releasable from a fishing line as it strikes the water at the end of a cast and which will be attached to the line by an element which will not distract the attention of a fish from the bait or lure on the line.

Further objects and advantages of this invention will become apparent from the following description referring to the accompanying drawing and the features of novelty which characterize this invention will be pointed out with particularity in the claims appended to and forming a part of this specification.

Figure 1:
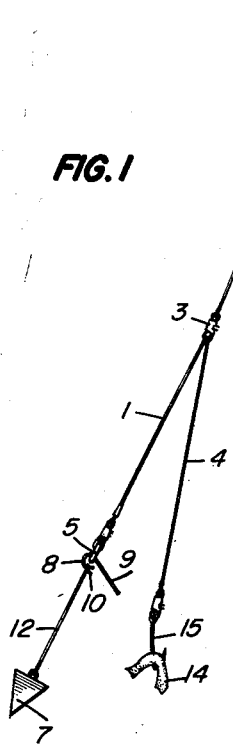
FIG. 1 is a view of the end of a fishing line to which a disposable sinker device incorporating the present invention is attached and illustrates the relative positions assumed by the disposable sinker device elements during a cast and before the fishing line strikes the water.
Figure 2:
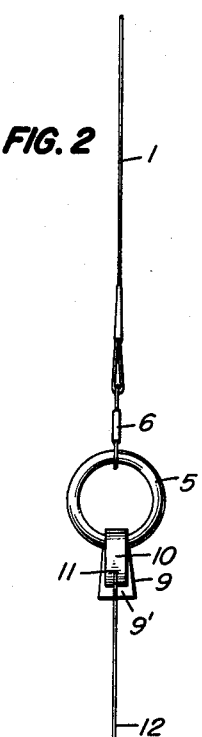
FIG. 2 is an enlarged view of the detachable sinker device shown in FIG. 1, illustrating the manner in which the sinker is releasably secured to the mounting element when it is suspended freely in space.
Figure 3:
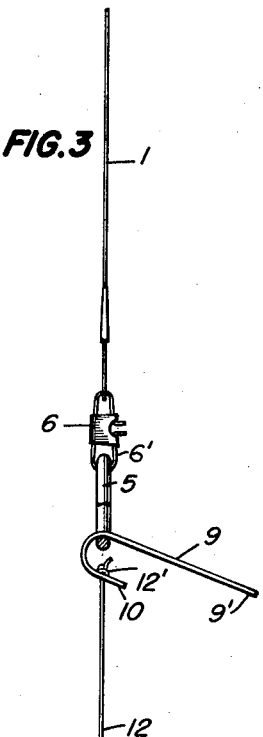
FIG. 3 is a view of the disposable sinker device shown in FIGS. 1 and 2 illustrating the device at right angles to the view shown in FIG. 2, with the mounting element shown partly broken away to illustrate more clearly the relative hooked arrangement of the detachable parts of the device.
Figure 4:
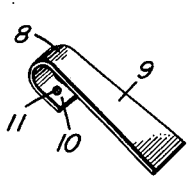
Figure 5:
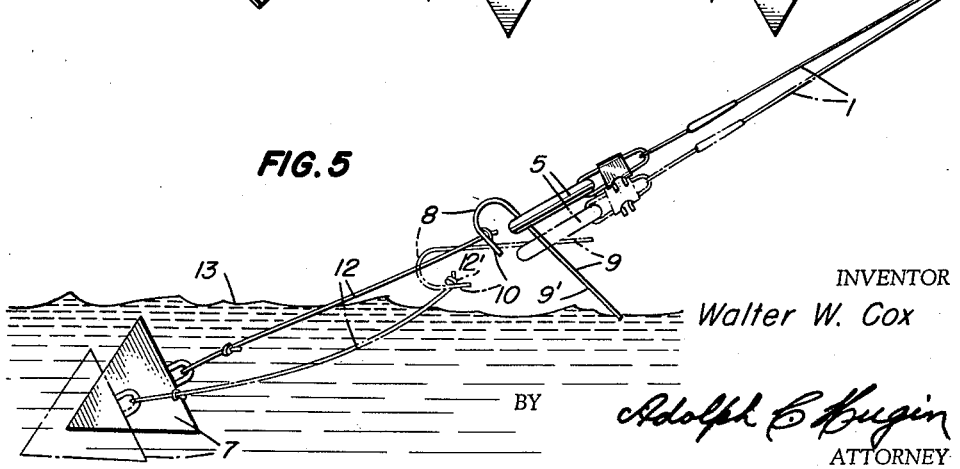

FIG. 4 is a perspective view of the U-shaped disposable sinker attachment device showing details of this element; and FIG. 5 illustrates the disposable sinker device shown in FIGS. 1, 2, and 3 at the end of a cast, showing in solid lines its position immediately at the end of a cast as the sinker first enters the water and the water-engaging face of the deflector arm of the U-shaped attachment element first contacts the water, and showing, in dot and dash lines, the resultant release of the sinker shortly after the water-engaging face of the attachment element has come in contact with the water, thereby releasing the sinker from its attachment to the fishing line.

Referring to the drawing, an improved disposable sinker device incorporating the present invention is shown which preferably includes a suitable leader 1, which can be attached to the end of a fishing line 2 in any suitable manner, as to the attachment member 3, to which the fish hook leader 4 also is secured. A rigid, preferably substantially transparent, mounting element 5, also preferably in the form of a ring or loop formed of lightweight plastic material, is secured to the end of the leader 1 in any suitable manner, as by an attachment link 6. The attachment link 6, as shown in FIGS. 1, 3, and 5, is a simple spring clip having a relatively rigid loop 6' through which the ring 5 is attached to the leader 1. Various sizes of such clips are commercially available on the market.

In order to facilitate the attachment of a sinker to the end of the line and to assure its disengagement from the line at the end of a cast when it strikes the water, a sinker weight 7, of any suitable type, is releasably attached to the ring mounting element 5 by a U-shaped element 8 having one leg 9 thereof longer than the other leg 10 and formed with a flared relatively wide substantially flat water-engaging face 9'. This U-shaped attaching element is adapted to support the sinker 7 on the fishing line 1 by hooked engagement with the mounting ring element 5 as shown in FIGS. 1, 2, and 3, and the shorter leg thereof is formed with an attachment eye 11 which provides a point of attachment for a sinker line 12 secured to the sinker 7. The sinker line 12 may conveniently be secured to the U-shaped element simply by threading it through the attachment eye 11 and knotting the end of the line, as is more clearly shown at 12' in FIG. 3.

The U-shaped element 8 is a rigid member which is preferably formed of metal, and the longer leg 9 thereof is of sufficient weight so that when it is hooked through the mounting ring element 5 it will balance the weight of the smaller leg 10 and that of the sinker 7 as shown in FIGS. 2 and 3. In this manner the U-shaped element 8 extends through the aperture or opening in the mounting ring element 5 and the longer leg 9 forms a deflector lever which releasably attaches the sinker 7 to the the end of a cast when the sinker 7 strikes the water 13, it will first enter the water and shortly thereafter the water engaging face 9' of the longer arm 9 of the U-shaped element will strike the water 13, as shown in solid lines, so that the impact of the water on the face 9' will deflect the longer leg 9 upwardly, and it will act as a deflector lever to move the U-shaped element to the position shown in the dot-and-dash lines. In this position, the sinker 7 will draw the longer leg 9 out of its hooked position on the mounting ring element 5 and the leg 9 be slid out therefrom, whereby the sinker and the U-shaped element 8 will be immediately and fully released from the mounting ring element 5 and the fishing line 2, thereby allowing the bait or lure to be freely maneuverable on or near the surface of the water. Since both the mounting ring element 5 and the U-shaped element 8 are of relatively rigid material they will always remain readily releasable from each other and, since the mounting ring 5 preferably is substantially transparent and its attachment elements 6 and 1 are relatively small, there will remain attached to the end of the fishing line substantially nothing to distract a fish's attention from the bait 14 on a fishing hook 15 secured by the leader 4 to the fishing line 2. This construction therefore provides for improving the length of cast by the addition of a suitable sinker to the end of a fishing line and for the instant release of the sinker from the end of the fishing line when it strikes the water at the end of a cast.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A disposable sinker device comprising a rigid ring mounting element adapted to be secured to a fishing line, a releasable sinker attaching means comprising a rigid deflector lever having a relatively small open hooked end adapted to be hooked to said ring mounting element with said deflector lever on the upper side and said small end on the lower side, said small end having a sinker line attachment eye at a location tending to maintain said deflector lever in hooked engagement with and releasably attached to said ring mounting element when a sinker is freely suspended from said eye and during a casting of the fishing line, a sinker, and an attachment line for securing said sinker to said eye of said small end, said deflector lever being adapted to be deflected from its hooked engagement with said ring mounting element when striking the water during a cast whereby said sinker and deflector lever are released from said ring mounting element.

2. A disposable sinker device comprising a rigid substantially transparent mounting element adapted to be secured to a fishing line, a releasable sinker attaching means comprising a U-shaped element with one leg longer than the other and formed as a rigid deflector lever having a water-engaging face, said U-shaped element being adapted to be hooked over said mounting element, said other leg of said U-shaped element having a sinker line attachment eye at a location tending to maintain said U-shaped element in hooked engagement with and releasably attached to said mounting element when a sinker is freely suspended from said eye and during a casting of the fishing line, a sinker, and an attachment line for securing said sinker to said U-shaped element at said attachment eye, said U-shaped element being adapted to be deflected from its hooked engagement with the mounting element when said water-engaging face strikes the water during a cast whereby said sinker and U-shaped element are released from said mounting element.

3. A disposable sinker device comprising a rigid mounting element adapted to be secured to a fishing line and having an aperture therein, a releasable sinker attaching means comprising a rigid deflector lever adapted to extend through said mounting element aperture and having a relatively small open hooked end adapted to extend around said mounting element with a sinker line attachment eye at a location on said hooked end tending to maintain said deflector lever and hooked end in hooked engagement with and releasably attached to said mounting element when a sinker is freely suspended from said eye and during a casting of the fishing line, said deflector lever being adapted when striking the water during a cast to be deflected from its hooked engagement with said mounting element whereby said deflector lever with the attached sinker is released from said mounting element.

4. A disposable sinker device comprising a rigid mounting element having an aperture therein and leader means for securing said mounting element to a fishing line, a releasable sinker attaching means comprising a rigid deflector lever adapted to extend through said mounting element aperture and having a relatively small hooked end adapted to extend freely hooked around said mounting element with a point of attachment for a sinker line at a location on said hooked end tending to maintain said deflector lever and hooked end in hooked engagement with and releasably attached to said mounting element when a sinker is freely suspended therefrom and during a casting of the fishing line, a sinker, and an attachment line for securing said sinker to said hooked end at said point of attachment, said deflector lever being adapted when striking the water during a cast to be deflected from its hooked engagement with said mounting element and slid therefrom whereby said sinker and deflector lever are released from said mounting element.

5. A disposable sinker device comprising a rigid mounting element adapted to be secured to a fishing line, a releasable sinker attaching means comprising a rigid deflector lever having a water-engaging face and a relatively smll open hooked end adapted to be hooked around said mounting element, said hooked end having a sinker line attachment eye at a location tending to maintain said deflector lever and hooked end in hooked engagement with and releasably attached to said mounting element when a sinker is freely suspended from said eye and during a casting of the fishing line, a sinker, and an attachment line for securing said sinker to said eye of said hooked end, said deflector lever being adapted to be deflected from its hooked engagement with said mounting element when said water-engaging face thereof strikes the water during a cast whereby said sinker and deflector lever are released from said mounting element.

6. A disposable sinker device comprising a rigid mounting element adapted to be secured to a fishing line, a releasable sinker attaching means comprising a pair of connected angularly extending legs, one of said legs forming a rigid deflector lever having a water-engaging face and being adapted to be hooked over said mounting element, said other leg having a sinker line attachment at a location tending to maintain said pair of legs in hooked engagement with and releasably attached to said mounting element when a sinker is freely suspended from said other leg and during a casting of the fishing line, a sinker, and an attachment line for securing said sinker to said attachment on said other leg, said deflection lever leg being adapted to be deflected from its hooked engagement with the mounting element when said water-engaging face thereof strikes the water during a cast whereby said sinker and attaching means are released from said mounting element.

7. A disposable sinker device comprising a rigid mounting element adapted to be secured to a fishing line, a releasable sinker attaching means comprising a pair of connected angularly extending legs, one of said legs forming a rigid deflector lever having a water-engaging face and being adapted to be hooked to said mounting element, said other leg having a sinker line attachment at a location tending to maintain said pair of legs in hooked engagement with and releasably attached to said mounting element when a sinker is freely suspended from said other leg and during a casting of the fishing line, said deflection lever leg being adapted to be deflected from its hooked engagement with the mounting element when said water-engaging face thereof strikes the water during a cast whereby the sinker and attaching means are released from said mounting element.

References Cited in the file of this patent

UNITED STATES PATENTS

| | | |
|---|---|---|
| 1,606,583 | Ladd et al. | Nov. 9, 1926 |
| 2,506,820 | Webb | May 9, 1950 |
| 2,687,592 | Purcell | Aug. 31, 1954 |
| 2,741,059 | Ostrowski | Apr. 10, 1956 |
| 2,884,735 | Ticer | May 5, 1959 |